United States Patent [19]
Ohyama

[11] Patent Number: 5,742,280
[45] Date of Patent: Apr. 21, 1998

[54] HAND-WRITTEN GRAPHIC FORM INPUTTING APPARATUS

[75] Inventor: Yutaka Ohyama, Tokyo, Japan

[73] Assignee: NEC Corporation, Tokyo, Japan

[21] Appl. No.: 695,532

[22] Filed: Aug. 12, 1996

Related U.S. Application Data

[63] Continuation of Ser. No. 364,974, Dec. 28, 1994, abandoned.

[30] Foreign Application Priority Data

Dec. 28, 1993 [JP] Japan ................... 5-336608

[51] Int. Cl.$^6$ ........................................ G09G 5/00
[52] U.S. Cl. ..................... 345/173; 382/185; 382/189
[58] Field of Search ............................... 345/141, 173, 345/179; 382/185, 189, 199

[56] References Cited

U.S. PATENT DOCUMENTS

| | | | |
|---|---|---|---|
| 3,786,271 | 1/1974 | Joy et al. | 250/398 |
| 4,365,235 | 12/1982 | Greanias et al. | 382/189 |
| 4,440,513 | 4/1984 | Kataoka et al. | 345/173 |
| 4,641,354 | 2/1987 | Fukunaga et al. | 345/173 |
| 4,672,683 | 6/1987 | Matsueda | 345/179 |
| 4,680,804 | 7/1987 | Kuzunuki et al. | 382/185 |
| 4,727,496 | 2/1988 | Ryouki | 395/141 |
| 4,975,961 | 12/1990 | Sakoe | 381/43 |
| 4,991,007 | 2/1991 | Corley | 348/188 |
| 5,148,522 | 9/1992 | Okazaki | 395/161 |
| 5,157,737 | 10/1992 | Sklarew | 345/173 |
| 5,173,946 | 12/1992 | Rao | 382/199 |
| 5,389,745 | 2/1995 | Sakamoto | 345/179 |
| 5,412,402 | 5/1995 | Searby et al. | 345/173 |

FOREIGN PATENT DOCUMENTS

| | | |
|---|---|---|
| 61-28180 | 2/1986 | Japan. |
| 62-72087 | 4/1987 | Japan. |

*Primary Examiner*—Kee M. Tung
*Assistant Examiner*—Matthew Luu
*Attorney, Agent, or Firm*—Foley & Lardner

[57] ABSTRACT

A hand-written graphic form inputting apparatus by which a plurality of hand-written graphic forms can be inputted efficiently is disclosed. When a hand-written graphic form inputted from a graphic form inputting device is recognized so as to produce graphic form candidates and the graphic form candidates thus produced are stored into a graphic form candidate buffer, a graphic form relation determination device determines the correlation between the inputted graphic form inputted and the graphic form candidates. The graphic form determination device determines a most likely graphic form candidate from among the graphic form candidates in accordance with a result of a determination from the graphic form relation determination device. A graphic form position determination device determines the size of the graphic form to be displayed on a display device in accordance with a result of the determination from the graphic form relation determination device and a graphic form position determination device determines the orientation of the graphic form to be displayed on a display device in accordance with a result of the determination from the graphic form relation determination device.

6 Claims, 7 Drawing Sheets

| CANDIDATE | SHAPE | CHARACTERISTIC POINT COORDINATES | LIKELIHOOD |
|---|---|---|---|
| 1 | RECTANGLE | (100,100),(250,400) | 0.90 |
| 2 | SQUARE | (100,100),(300,300) | 0.80 |
| 3 | RIGHT-ANGLE TRAPEZOID | (100,100),(250,100),(300,100),(250,400) | 0.65 |

FIG.5(b)

| CANDIDATE | SHAPE | CHARACTERISTIC POINT COORDINATES | LIKELIHOOD |
|---|---|---|---|
| 1 | RIGHT-ANGLE TRAPEZOID | (106,500),(250,500),(106,780),(250,800) | 0.80 |
| 2 | RECTANGLE | (106,500),(250,810) | 0.75 |

FIG.6

| GRAPHIC FORM | SHAPE | CHARACTERISTIC POINT COORDINATES |
|---|---|---|
| 1 | RECTANGLE | (100,100),(250,400) |

FIG.7

| GRAPHIC FORM | CANDIDATE | SHAPE | SIZE | POSITION |
|---|---|---|---|---|
| 1 | 1 | NOT COINCIDENT | SAME | HORIZONTAL |
| 1 | 2 | COINCIDENT | SAME | HORIZONTAL |

FIG.8(a)

| GRAPHIC FORM | SHAPE | CHARACTERISTIC POINT COORDINATES |
|---|---|---|
| 1 | RECTANGLE | (100,100),(250,400) |
| 2 | RECTANGLE | (106,500),(250,810) |

FIG.8(b)

| GRAPHIC FORM | SHAPE | CHARACTERISTIC POINT COORDINATES |
|---|---|---|
| 1 | RECTANGLE | (100,100),(250,400) |
| 2 | RECTANGLE | (106,500),(256,800) |

FIG.8(c)

| GRAPHIC FORM | SHAPE | CHARACTERISTIC POINT COORDINATES |
|---|---|---|
| 1 | RECTANGLE | (100,100),(250,400) |
| 2 | RECTANGLE | (103,500),(247,810) |

FIG.9

| GRAPHIC FORM | SHAPE | CHARACTERISTIC POINT COORDINATES |
|---|---|---|
| 1 | CIRCLE | (100,100),(100,50) |

FIG.10

| CANDIDATE | SHAPE | CHARACTERISTIC POINT COORDINATES | LIKELIHOOD |
|---|---|---|---|
| 1 | CIRCLE | (105,102),(105,82) | 0.95 |

FIG.11

| GRAPHIC FORM | CANDIDATE | SHAPE | SIZE | POSITION |
|---|---|---|---|---|
| 1 | 1 | COINCIDENT | SIMILAR | COINCIDENT |

FIG.12

| GRAPHIC FORM | SHAPE | CHARACTERISTIC POINT COORDINATES |
|---|---|---|
| 1 | CIRCLE | (100,100), (100,50) |
| 2 | CIRCLE | (100,100), (100,80) |

HAND-WRITTEN GRAPHIC FORM INPUTTING APPARATUS

This application is a continuation of application Ser. No. 08/364,974, filed Dec. 28, 1994, now abandoned.

BACKGROUND OF THE INVENTION

1. Field of the Invention

This invention relates to a hand-written graphic form inputting apparatus for inputting a hand-written graphic form using a tablet or a like inputting instrument, and more particularly to a hand-written graphic form inputting apparatus by which a plurality of graphic forms can be inputted.

2. Description of the Related Art

A method of inputting a graphic form making use of an inputting instrument such as a tablet is employed not only for engineering applications such as an application for inputting a drawing figure of a mechanism but also widely for other applications such as an application for producing business material such as an OHP (Overhead Projector) drawing figure.

One of methods of inputting a graphic form is to first designate the shape of a graphic form such as a circle or a rectangle by such means as selection on a menu and input coordinate data representing characteristic points of the graphic form (the apices of a graphic form defined by straight lines, the center and the radius of a circle, or the like). This method, however, is disadvantageous in that the operation for designating a graphic form is complicated and time-consuming, and besides, since not the graphic form itself but characteristic points of the graphic form are inputted, the operator cannot input by intuition and accordingly must fully know the operation method.

As another graphic form inputting method, a hand-written graphic form inputting method is known wherein the operator writes a graphic form at a desired position of an inputting apparatus directly by hand and the inputting apparatus recognizes the shape of the graphic form and displays the graphic form in engrossment. The hand-written graphic inputting method provides a natural inputting manner which can be grasped readily by the operator by intuition.

One of conventional hand-written graphic form inputting apparatus is disclosed in Japanese Patent Laid-Open Application No. Showa 62-72087 wherein a type of a graphic form is first determined based on coordinate information of a hand-written character or graphic form written on a tablet and then graphic job processing for engrossment is performed based on the type of the graphic form thus determined.

Another conventional hand-written graphic form inputting apparatus is disclosed in Japanese Patent Laid-Open Application No. Showa 61-28180 wherein a hand-written graphic form is compared with library graphic forms stored in memory in advance to effect similarity degree evaluation, and if the similarity degree evaluation proves that one of the library graphic forms is determined to be identical with the hand-written graphic form, the library graphic form is outputted as a result of recognition. The document also discloses a method of producing a recognition result candidate lattice, which can be used to obtain a desired recognition result from a plurality of recognition result candidates.

With both of the conventional hand-written graphic form inputting apparatus described above, an operator can input an engrossed graphic form by writing a desired graphic form at a desired position.

Figure 4:
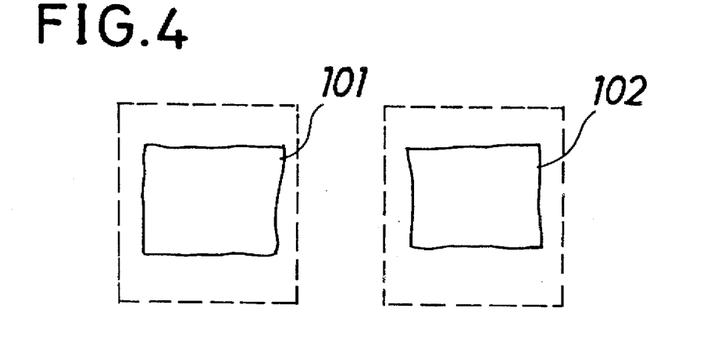
FIG. 4 is a diagrammatic view illustrating exemplary hand-written graphic forms inputted by way of graphic form inputting means employed in the hand-written graphic form inputting apparatus of FIGS. 1 to FIGS. 5(a) and 5(b) are tables illustrating exemplary stored contents of a graphic form candidate buffer employed in the hand-written graphic form inputting apparatus of FIGS. 1 to 3.

However, when it is intended to input a plurality of graphic forms, the graphic forms must be inputted one by one irrespective of the relationship between them. For example, an operator may want to input a plurality of rectangles 101 and 102 of a same shape and an equal size as shown in FIG. 4. In inputting of a hand-written graphic form, it is difficult to input a plurality of graphic forms individually in appropriate forms with appropriate sizes at appropriate positions, and if individual rectangles or circles are inputted independently of each other, even if the graphic forms of a same shape are successively inputted, information regarding a graphic form inputted formerly is not used efficiently. As a result, the plurality of graphic forms are inputted but not with appropriate sizes or at appropriate positions.

SUMMARY OF THE INVENTION

It is an object of the present invention to provide a hand-written graphic form inputting apparatus by which a plurality of hand-written graphic forms can be inputted efficiently.

In order to attain the object described above, according to a first aspect of the present invention, there is provided a hand-written graphic form inputting apparatus, which comprises graphic form inputting means for inputting a hand-written graphic form, graphic form recognition means for recognizing a hand-written graphic form inputted by way of the graphic form inputting means and outputting graphic form candidates, a graphic form candidate buffer for temporarily storing graphic form candidates outputted from the graphic form recognition means, graphic form determination means for determining a most likely graphic form candidate from among graphic form candidates stored in the graphic form candidate buffer, graphic form storage means for storing a graphic form or forms determined by the graphic form determination means, display means for displaying thereon a graphic form or forms stored in the graphic form storage means, and graphic form relation determination means for determining correlation between graphic form candidates stored in the graphic form candidate buffer and a graphic form or forms stored in the graphic form storage means, the graphic form determination means determining a most likely graphic form in accordance with a result of determination of the graphic form relation determination means.

In the hand-written graphic form inputting apparatus, a hand-written graphic form inputted is recognized and a plurality of graphic form candidates are produced and stored into the graphic form candidate buffer. The graphic form relation determination means determines whether or not some of the graphic form candidates stored in the graphic form candidate buffer have correlation with a graphic form or forms stored already in the graphic form storage means, and notifies the graphic form determination means of a result of the determination. Thus, the graphic form determination means preferentially selects, upon determination of a most likely graphic form candidate from among the graphic form candidates stored in the graphic form candidate buffer, that one of the graphic form candidates which has been determined to have close correlation to the graphic form or forms stored in the graphic form storage means.

With the hand-written graphic form inputting apparatus, when a plurality of graphic forms are successively inputted by the operator, since a graphic form which has close correlation to some other graphic form inputted formerly is recognized giving priority to the correlation, a graphic form candidate which is estimated to be desired by the operator can be provided preferentially.

According to another aspect of the present invention, there is provided a hand-written graphic form inputting apparatus, which comprises graphic form inputting means for inputting a hand-written graphic form, graphic form recognition means for recognizing a hand-written graphic form inputted by way of the graphic form inputting means and outputting graphic form candidates, a graphic form candidate buffer for temporarily storing graphic form candidates outputted from the graphic form recognition means, graphic form determination means for determining a most likely graphic form candidate from among graphic form candidates stored in the graphic form candidate buffer, graphic form storage means for storing a graphic form or forms determined by the graphic form determination means, display means for displaying thereon a graphic form or forms stored in the graphic form storage means, graphic form relation determination means for determining correlation between graphic form candidates stored in the graphic form candidate buffer and a graphic form or forms stored in the graphic form storage means, and graphic form size determination means for determining a size of a graphic form to be displayed on the display means in accordance with a result of determination of the graphic form relation determination means.

In the hand-written graphic form inputting apparatus, a hand-written graphic form inputted is recognized and a plurality of graphic form candidates are produced and stored into the graphic form candidate buffer. The graphic form relation determination means determines whether or not some of the graphic form candidates stored in the graphic form candidate buffer have correlation with a graphic form or forms stored already in the graphic form storage means. The graphic form size determination means determines the size of a graphic form to be displayed on the display means, that is, the size of the most likely graphic formed determined by the graphic form determination means, in accordance with the graphic form correlation determined by the graphic form relation determination means. The graphic form with the size thus determined is stored into the graphic form storage means.

With the hand-written graphic form inputting apparatus, since the size of a graphic form to be displayed is determined in accordance with correlation to another graphic form inputted formerly, the operator need not operate for alignment or positioning of graphic forms, and the time required for such operation can be eliminated.

According to a third aspect of the present invention, there is provided a hand-written graphic form inputting apparatus, which comprises graphic form inputting means for inputting a hand-written graphic form, graphic form recognition means for recognizing a hand-written graphic form inputted by way of the graphic form inputting means and outputting graphic form candidates, a graphic form candidate buffer for temporarily storing graphic form candidates outputted from the graphic form recognition means, graphic form determination means for determining a most likely graphic form candidate from among graphic form candidates stored in the graphic form candidate buffer, graphic form storage means for storing a graphic form or forms determined by the graphic form determination means, display means for displaying thereon a graphic form or forms stored in the graphic form storage means, graphic form relation determination means for determining correlation between graphic form candidates stored in the graphic form candidate buffer and a graphic form or forms stored in the graphic form storage means, and graphic form position determination means for determining a position of a graphic form to be displayed on the display means in accordance with a result of determination of the graphic form relation determination means.

In the hand-written graphic form inputting apparatus, a hand-written graphic form inputted is recognized and a plurality of graphic form candidates are produced and stored into the graphic form candidate buffer. The graphic form relation determination means determines whether or not some of the graphic form candidates stored in the graphic form candidate buffer have correlation with a graphic form or forms stored already in the graphic form storage means. The graphic form position determination means determines the position of a graphic form to be displayed on the display means, that is, the position of the most likely graphic formed determined by the graphic form determination means, in accordance with the graphic form correlation determined by the graphic form relation determination means. The graphic form with the position thus determined is stored into the graphic form storage means.

With the hand-written graphic form inputting apparatus, since the position of a graphic form to be displayed is determined in accordance with correlation to another graphic form inputted formerly, the operator need not operate for alignment or adjustment in position of graphic forms, and the time required for such operation can be eliminated.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
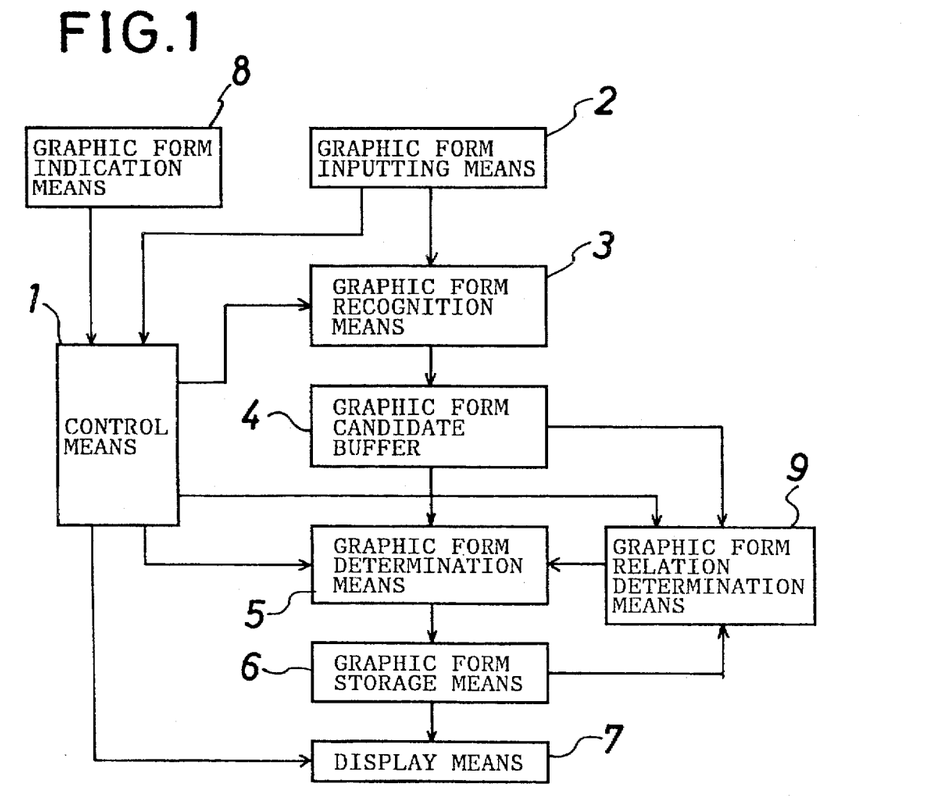
FIG. 1 is a block diagram of a hand-written graphic form inputting apparatus showing a first preferred embodiment of the present invention.

Referring first to FIG. 1, there is shown a hand-written graphic form inputting apparatus according to a first preferred embodiment of the present invention. The hand-written graphic form inputting apparatus shown includes control means 1 for controlling operation of the entire hand-written graphic form inputting apparatus, graphic form inputting means 2 for inputting a hand-written graphic form, graphic form recognition means 3 for recognizing the hand-written graphic form inputted from the graphic form inputting means 2 and outputting graphic form candidates, a graphic form candidate buffer 4 for temporarily storing the graphic form candidates outputted from the graphic form recognition means 3, graphic form determination means 5 for determining a most likely graphic form candidate from among the graphic form candidates stored in the graphic form candidate buffer 4, graphic form storage means 6 for storing the most likely graphic form candidate determined by the graphic form determination means 5, display means 7 for displaying thereon the graphic form stored in the graphic form storage means 6, graphic form indication means 8 for indicating a desired one of the graphic form candidates, and graphic form relation determination means 9 for determining the relationship between the graphic form candidates stored in the graphic form candidate buffer 4 and the graphic form stored in the graphic form storage means 6.

The control means 1, the graphic form recognition means 3, the graphic form determination means 5 and the graphic form relation determination means 9 may be constituted from a central processing unit (CPU) and processing programs; the graphic form inputting means 2 may be constituted from a coordinate inputting apparatus such as a tablet and a pen; the graphic form candidate buffer 4 and the graphic form storage means 6 may be constituted from a memory or memories; the graphic form indication means 8 may be constituted from a keyboard or a virtual button on a tablet; and the display means 7 may be constituted from a cathode ray tube (CRT) or a liquid crystal display unit.

Operation of the hand-written graphic form inputting apparatus of FIG. 1 will be described below by way of an example wherein graphic forms shown in FIG. 4 are inputted. It is assumed here that, at an initial stage, no graphic form is written and the graphic form storage means 6 is free or empty.

Referring to FIGS. 1 and 4, an operator will first write and input a hand-written rectangle 101 on and to the graphic form inputting means 2. The graphic form recognition means 3 recognizes the hand-written rectangle 101 written on the graphic form inputting means 2 under the control of the control means 1 and stores a result of the recognition into the graphic form candidate buffer 4. The recognizing operation of the graphic form recognition means 3 is similar to that disclosed in Japanese Patent Laid-Open Application No. Showa 61-28180 mentioned hereinabove, and description thereof is omitted herein.

Figure 5:
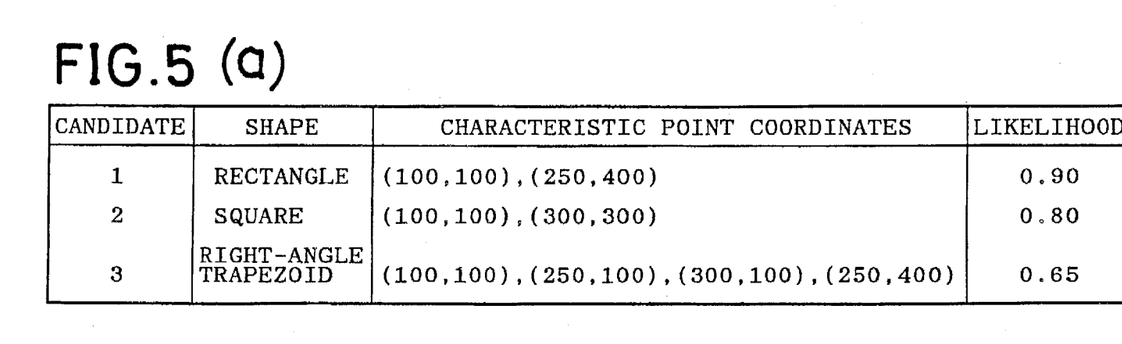

FIG. 5(a) illustrates the stored contents of the graphic form candidate buffer 4 here. From FIG. 5(a), it can be seen that three candidates of a rectangle, a square and a right-angle trapezoid (trapezoid having two right-angle apices) are produced as a result of the recognition of the inputted hand-written rectangle 101 by the graphic form recognition means 3 and that coordinate values defining the shapes and the positions of the graphic form candidates and likelihoods representing the likeliness degrees of the graphic form candidates are stored in the graphic form candidate buffer 4. In FIG. 5(a), as coordinate values, coordinate values of two apices on a diagonal are described for the square and the rectangle, and coordinate values of the four apices are described for the right-angle trapezoid.

Figure 6:
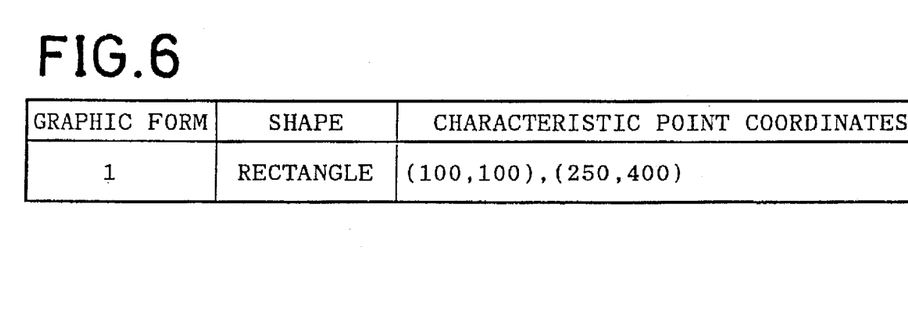
FIG. 6 is a table illustrating exemplary stored contents of graphic form storage means employed in the hand-written graphic form inputting apparatus of FIGS. 1 to 3.

The graphic form determination means 5 investigates the relationship between the graphic form candidates stored in the graphic form candidate buffer 4 and a graphic form or forms having been inputted formerly and stored in the graphic form storage means 6. At this point of time, however, the graphic form storage means 6 is empty as described above, and accordingly, the graphic form relation determination means 9 produces no information. The graphic form determination means 5 extracts a most likely graphic form candidate from among the graphic form candidates stored in the graphic form candidate buffer 4 and stores it into the graphic form storage means 6. Here, if it is assumed that the graphic form determination means 5 determines the rectangle, which is the first candidate in FIG. 5(a), as a most likely graphic form, the graphic form determination means 5 stores the information regarding the rectangle into the graphic form storage means 6, and the graphic form candidate buffer 4 is cleared. FIG. 6 illustrates the thus stored contents of the graphic form storage means 6.

The display means 7 displays the stored contents of the graphic form storage means 6. As a result of the procedure described so far, the hand-written graphic form written on the graphic form inputting means 2 is recognized and displayed in engrossment on the display means 7. It is to be noted that, while the hand-written graphic form inputting apparatus described above adopts the procedure wherein a graphic form recognized after inputting is automatically produced, it may operate in such a different manner that graphic form candidates are stored into the graphic form storage means 6 by the graphic form determination means 5 and displayed on the display means 7 then a graphic form is determined finally at a point of time when an operator designates a desired graphic form by way of the graphic form indication means 8, whereafter the graphic form candidate buffer 4 is cleared.

It is assumed here that the operator then inputs another hand-written rectangle 102 by way of the graphic form inputting means 2. The graphic form recognition means 3 recognizes the hand-written rectangle 102 in accordance with the same procedure as described above and stores a result of the recognition into the graphic form candidate buffer 4. Here, it is assumed that a result illustrated in FIG. 5(b) is stored into the graphic form candidate buffer 4 by the graphic form recognition means 3. The items of the table in FIG. 5(b) have the same significance as those in FIG. 5(a). Thus, it can be seen from FIG. 5(b) that two candidates of a right-angle trapezoid and a rectangle are produced as a result of the recognition of the inputted hand-written rectangle 102 and that coordinate values defining the shapes and the positions of the graphic form candidates and the likelihoods representing the likeliness degrees of the graphic form candidates are stored in the graphic form candidate buffer 4.

Here, the graphic form relation determination means 9 investigates the relationship between the graphic form candidates stored in the graphic form candidate buffer 4 and the graphic form or forms having been inputted formerly and stored in the graphic form storage means 6.

Figure 7:
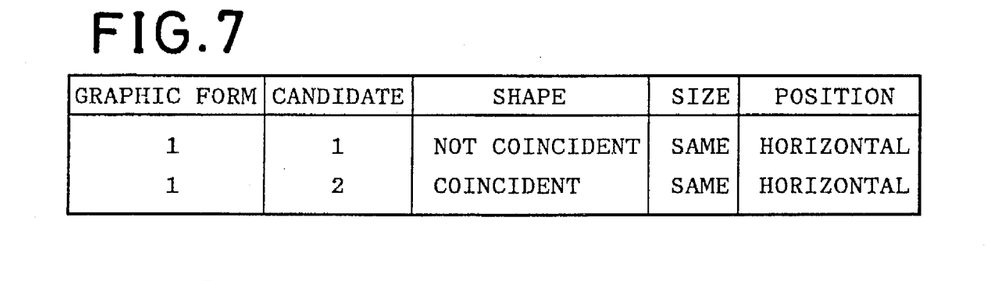
FIG. 7 is a table illustrating exemplary results of determination of graphic form relationship determination means employed in the hand-written graphic form inputting apparatus of FIGS. 1 to 3.

An exemplary result of the determination of the relationship between the graphic forms by the graphic form relation determination means 9 is illustrated in FIG. 7. Referring to FIG. 7, "GRAPHIC FORM" indicates the identification number of the graphic form in the graphic form storage means 6 ("FIGURE" in FIG. 6); "CANDIDATE" indicates the identification numbers of the graphic form candidates in the graphic form candidate buffer 4 ("CANDIDATE" in FIG. 5(b)); "SHAPE" indicates a result of determination whether the graphic form in question coincides in shape with the candidates; "SIZE" indicates whether or not it can be determined that the sizes of the graphic form in question and the candidates have some correlation (including congruent and similar relations taking the aspect ratio, the lengths of the sides and so forth into consideration); and "POSITION" indicates a result of determination whether or not it can be determined that the positions of the graphic form in question and the candidates (such as the positions of the centers of gravity or alignment) have some correlation. In the example illustrated in FIG. 7, while the graphic form 1 and the candidate 1 do not exhibit coincidence in shape between them, they have correlation in terms of the size and the position. However, the graphic form 1 and the candidate 2 have correlation in terms of all of the shape, the size and the position. Here, the terminology "have correlation" signifies that they have correlation including an error of such a degree that an operator can determine that it gets aware of correlation.

The graphic form determination means 5 determines from the result of the determination of the graphic form relation determination means 9 that the candidate 2 is more likely, and stores the candidate 2 into the graphic form storage means 6. Thereafter, the display means 7 displays thereon the stored contents of the graphic form storage means 6 similarly as in the display of the hand-written rectangle 101. As a result of the procedure described so far, both of the hand-written rectangle 101 and the hand-written rectangle 102 written on the graphic form inputting means 2 are displayed in engrossment on the display means 7.

Figure 2:
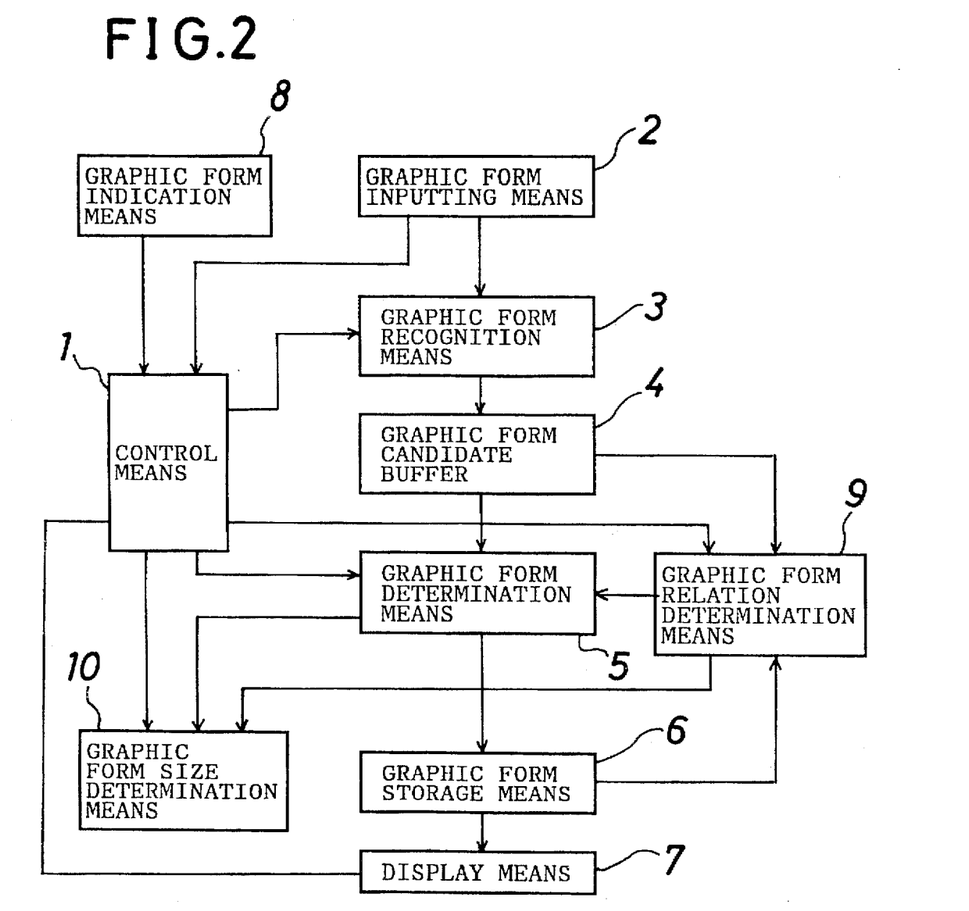
FIG. 2 is a block diagram of another hand-written graphic form inputting apparatus showing a second preferred embodiment of the present invention.

Referring now to FIG. 2, there is shown a hand-written graphic form inputting apparatus according to a second preferred embodiment of the present invention. The hand-written graphic form inputting apparatus of the present embodiment is a modification to and only different from the hand-written graphic form inputting apparatus of the first embodiment in that it additionally includes graphic form size determination means 10 for changing the size of a graphic form in accordance with a graphic form relationship determined by the graphic form relation determination means 9.

Operation of the hand-written graphic form inputting apparatus of the second embodiment will be described below by way of an example wherein the graphic forms shown in FIG. 4 are inputted.

Figure 8:
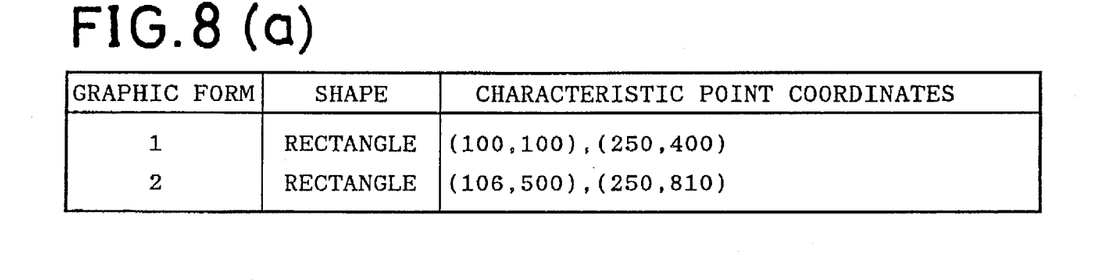
FIGS. 8(a) to 8(c) are tables illustrating different stored contents of the graphic form storage means.

The procedure of operation of the hand-written graphic form inputting apparatus after a hand-written rectangle 101 is inputted first until the graphic form determination means 5 determines it based on a result (FIG. 7) of determination of the graphic form relation determination means 9 that another hand-written rectangle 102 is a rectangle is the same as that of the hand-written graphic form inputting apparatus of the first embodiment. Here, since it is determined by the graphic form relation determination means 9 that the graphic form sizes of the graphic form 1 and the candidate 2 coincide with each other, the graphic form size determination means 10 changes the graphic form size of the candidate 2 to the size of the graphic form 1, and the candidate 2 of the thus changed size is stored into the graphic form storage means 6 and displayed on the display means 7. The stored contents of the graphic form storage means 6 then are such as illustrated in FIG. 8(b). As a result of the procedure, the two hand-written rectangles 101 and 102 having been written by the operator are displayed in engrossment with the sizes and the shapes thereof adjusted individually.

Figure 3:
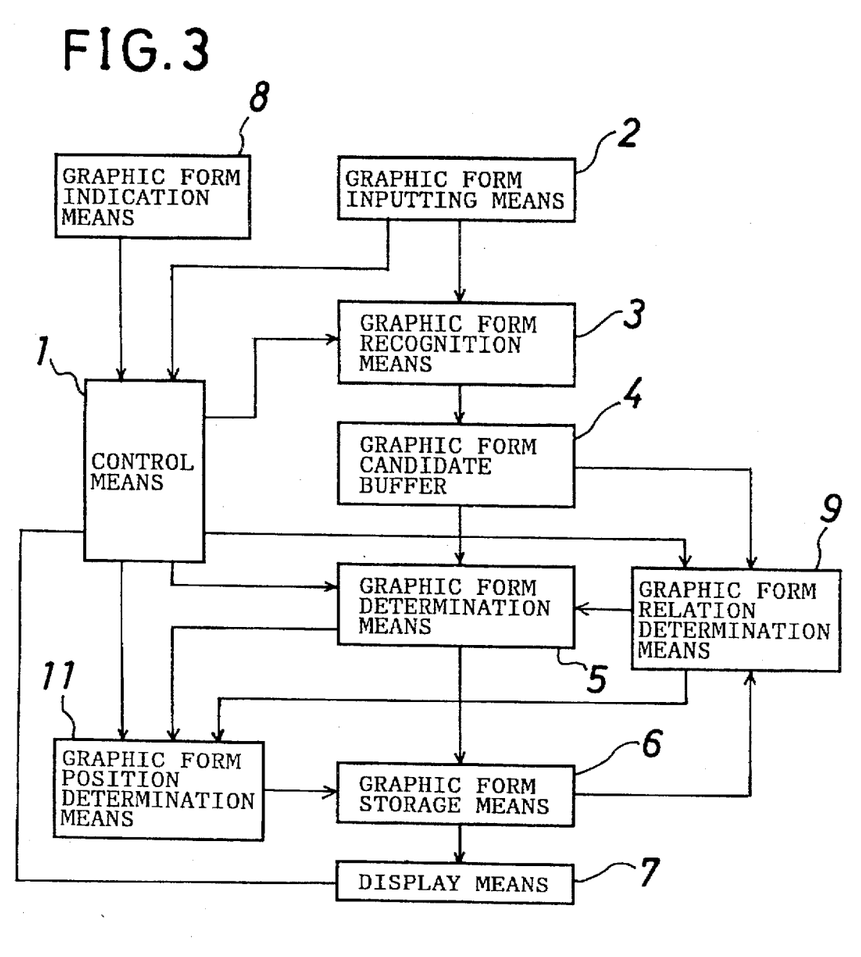
FIG. 3 is a block diagram of still another hand-written graphic form inputting apparatus showing a third preferred embodiment of the present invention.

Referring now to FIG. 3, there is shown a hand-written graphic form inputting apparatus according to a third preferred embodiment of the present invention. The hand-written graphic form inputting apparatus of the present embodiment is a modification to and only different from the hand-written graphic form inputting apparatus of the first and second embodiments in that it includes, in place of the graphic form size determination means 10 shown in FIG. 2, graphic form position determination means 11 for changing the position of a graphic form in accordance with a graphic form relationship determined by the graphic form relation determination means 9.

Operation of the hand-written graphic form inputting apparatus of the third embodiment will be described below by way of an example wherein the graphic forms shown in FIG. 4 are inputted.

Figure 8C:
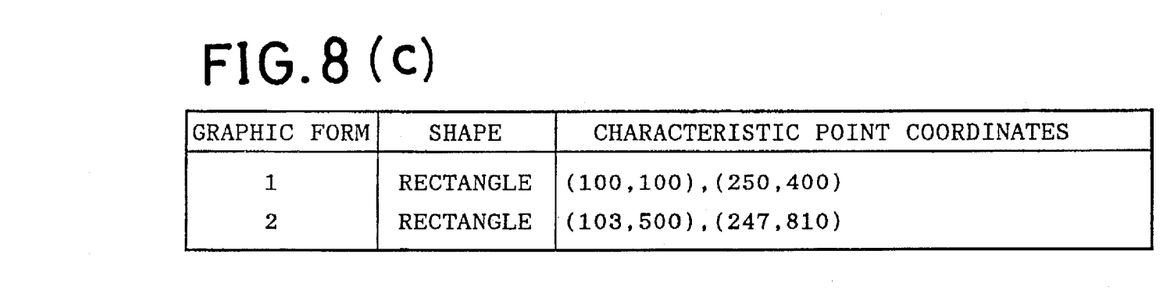

The procedure of operation of the hand-written graphic form inputting apparatus, after a hand-written rectangle 101 is first inputted until the graphic form determination means 5 determines it based on a result (FIG. 7) of determination of the graphic form relation determination means 9 that another hand-written rectangle 102 is a rectangle, is the same as that of the hand-written graphic form inputting apparatus of the first embodiment. Here, since it is determined by the graphic form relation determination means 9 that the positions of the graphic form 1 and the candidate 2 are horizontal positions, the graphic form position determination means 11 adjusts the position of the candidate 2 to the position of the graphic form 1, and the candidate 2 at the thus adjusted position is stored into the graphic form storage means 6 and displayed on the display means 7. The method of adjusting the graphic form position may be adjustment of the position of the center of gravity or of a certain side of the graphic form. The stored contents of the graphic form storage means 6 when the centers of gravity of the graphic form 1 and the candidate 2 are adjusted so that they are positioned at a horizontally same position as seen from FIG. 8(c). As a result of the procedure, the two hand-written rectangles 101 and 102 having been written by the operator are displayed in engrossment with the positions thereof adjusted horizontally.

Figures 9, 10:
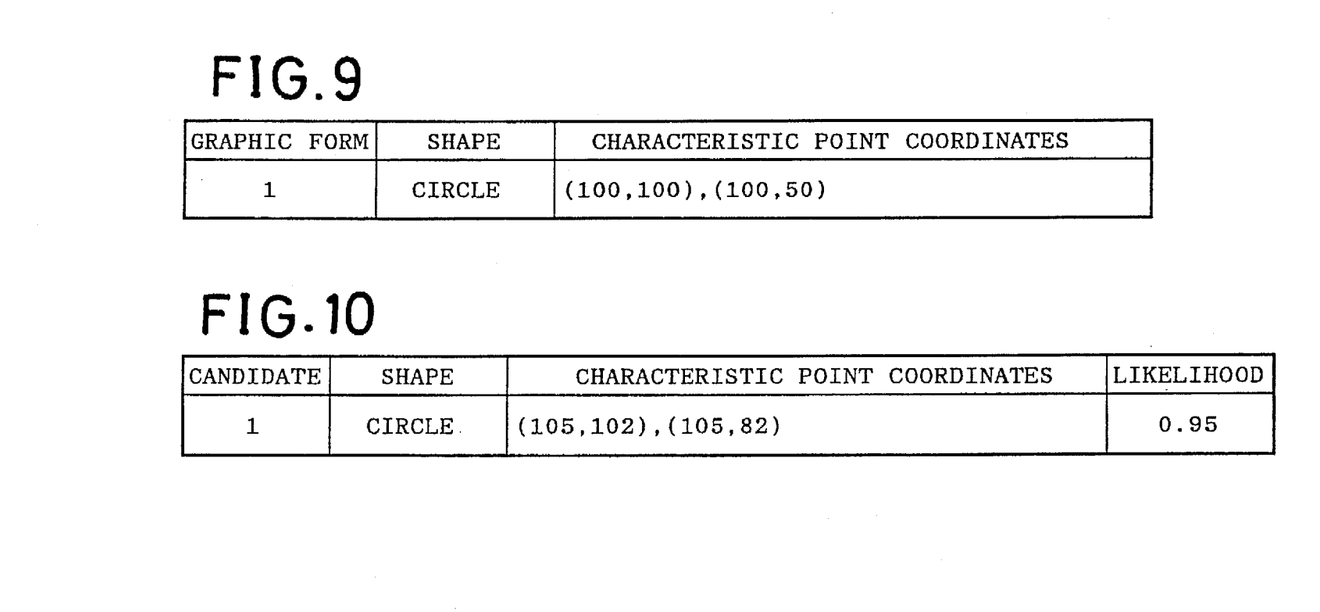
FIG. 9 is a table illustrating further different stored contents of the graphic form storage means.
FIG. 10 is a table illustrating different stored contents of the graphic form candidate buffer.
Figure 11:
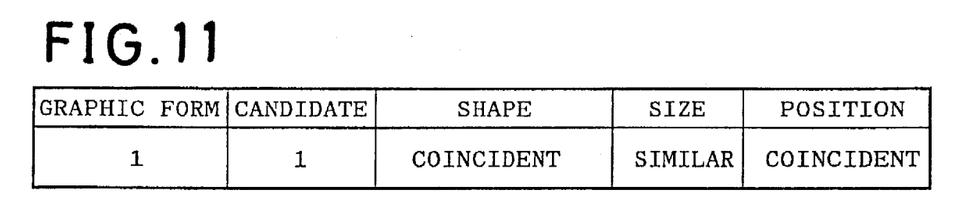
FIG. 11 is a table illustrating another exemplary result of determination of the graphic form relationship determination means.
Figure 12:
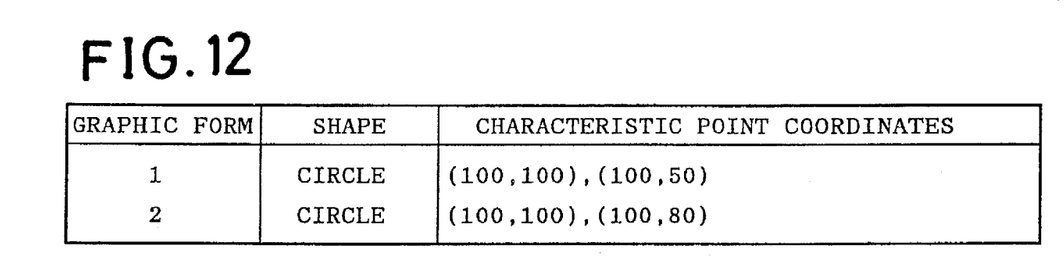
FIG. 12 is a table illustrating still further different stored contents of the graphic form storage means.

FIGS. 9, 10 and 11 illustrate exemplary stored contents of the graphic form storage means 6, the graphic form candidate buffer 4 and the graphic form relation determination means 9, respectively, when an operator first inputs a circle and then inputs another circle with the hand-written graphic form inputting apparatus of the third embodiment. In those figures, characteristic points of each circle are represented in terms of coordinates of the center and a point on a circumference of the circle. In this instance, since it is determined by the graphic form relation determination means 9 that the positions of the graphic form 1 stored in the graphic form storage means 6 and the candidate 1 stored in the graphic form candidate buffer 4 have correlation (the centers of them substantially coincide with each other), the graphic form position determination means 11 determines contents to be stored into the graphic form storage means 6 as such values as listed in FIG. 12. As a result, two circles (concentric circles) with the centers thereof registered with each other) are displayed on the display means 7.

It is to be noted that, while the hand-written graphic form inputting apparatus of any of the second and third embodiments is described having such a form that a result of determination of the graphic form relation determination means 9 is utilized in order for the graphic form determination means 5 to determine a most likely graphic form from among graphic form candidates stored in the graphic form candidate buffer 4, since the operations of the graphic form size determination means 10 and the graphic form position determination means 11 have no direct relation to the candidate determination procedure of the graphic form determination means 5, a result of determination of the graphic form relation determination means 9 may not be utilized for determination of candidates.

Further, the hand-written graphic form inputting apparatus of the second embodiment is constructed such that the sizes of graphic forms are adjusted to each other by the graphic form size determination means 10, whereas the hand-written graphic form inputting apparatus of the third embodiment is constructed such that the positions of the graphic forms are adjusted by the graphic form position determination means 11; but preferably both of the graphic form size determination means 10 and the graphic form position determination means 11 are provided so that the sizes and the positions of graphic forms may be adjusted with each other at a time.

Having now fully described the invention, it will be apparent to one of ordinary skill in the art that many changes and modifications can be made thereto without departing from the spirit and scope of the invention as set forth herein.

What is claimed is:

1. A hand-written graphic form inputting apparatus, comprising:

graphic form inputting means for inputting a hand-written graphic form;

a graphic form candidate buffer;

graphic form recognition means for recognizing the hand-written graphic form inputted by way of said graphic form inputting means; producing a plurality of graphic form candidates; and storing the plurality of graphic form candidates as types of forms, coordinate values and likelihoods representative of likelihood degrees of the graphic form candidates into said graphic form candidate buffer;

graphic form storage means for storing a graphic form candidate;

graphic form relation determination means for detecting correlation between at least one graphic form candidate among said plurality of graphic form candidates stored in said graphic form candidate buffer and said graphic form candidate stored in said graphic form storage means, and determining if said at least one graphic form candidate corresponds in shape to said graphic form candidate stored in said graphic form storage means;

graphic form determination means for, (a) if no graphic form candidate is stored in said graphic form storage means, determining one of the graphic form candidates stored in said graphic form candidate buffer which is highest in likelihood, extracting said one of the graphic form candidates from said graphic form candidate buffer, storing said one of the graphic form candidates into said graphic form storage means, and clearing said graphic form candidate buffer, and for, (b) if said graphic form relation determination means has determined that said at least one graphic form candidate corresponds in shape to said graphic form candidate stored in said graphic form storage means, extracting said at least one graphic form candidate from said graphic form candidate buffer, storing said at least one graphic form candidate into said graphic form storage means, and clearing said graphic form candidate buffer; and display means for displaying the graphic form candidates stored in said graphic form storage means.

2. A hand-written graphic form inputting apparatus as claimed in claim 1, further comprising graphic form size determination means for adjusting a size of said at least one graphic form candidate which has been determined to correspond in shape to a size of said graphic form candidate stored in said graphic form storage means so that said graphic form candidate stored in said graphic form storage means and said at least one graphic form candidate of the same size may be displayed on said display means.

3. A hand-written graphic form inputting apparatus as claimed in claim 1, further comprising graphic form position determination means for adjusting an orientation of said at least one graphic form candidate which has been determined to correspond in shape to an orientation of said graphic form candidate stored in said graphic form storage means so that said graphic form candidate stored in said graphic form storage means and said at least one graphic form candidate of the same orientation may be displayed on said display means.

4. A method of displaying a graphic form hand-written onto an inputting apparatus, comprising the steps of:

(a) inputting a hand-written graphic form;

(b) recognizing the inputted hand-written graphic form; producing a plurality of graphic form candidates based on said hand-written graphic form; and storing the plurality of graphic form candidates as types of forms, coordinate values and likelihoods representative of likelihood degrees of the graphic form candidates into a graphic form candidate buffer;

(c1) if no graphic form candidate has been previously determined as being highest in likelihood, determining one of the graphic form candidates which is highest in likelihood, extracting from said graphic candidate buffer said one of the graphic form candidates which is highest in likelihood, storing said one of the graphic form candidates into a graphic form storage means, and returning to step (a);

(c2) if a graphic form candidate has been previously determined as being highest in likelihood, determining if one of the graphic form candidates in the graphic candidate buffer corresponds in shape to the graphic form candidate, and extracting said one of the graphic form candidates which corresponds in shape from said graphic candidate buffer, and storing said one of the graphic form candidates into the graphic form storage means; and (d) displaying graphic form candidates stored in the graphic storage means.

5. A method of displaying a graphic form hand-written onto an inputting apparatus as recited in claim 4, further comprising the step of adjusting a size of said graphic form candidate which corresponds in shape to a size of said graphic form candidate previously determined as being highest in likelihood so that said graphic form candidate previously determined as being highest in likelihood and said one graphic form candidate of the same size may be displayed.

6. A method of displaying a graphic form hand-written onto an inputting apparatus as recited in claim 4, further comprising the step of adjusting an orientation of said one graphic form candidate which corresponds in shape to a size of said graphic form candidate previously determined as being highest in likelihood so that said graphic form candidate previously determined as being highest in likelihood and said one graphic form candidate of the same orientation may be displayed.

* * * * *